H. WIGHT.
METHOD OF FORMING LAST-BLANKS.

No. 182,253.  Patented Sept. 12, 1876.

Witnesses:
Jo. L. Enderle
Herbert T. Houghton

Inventor:
Henry Wight
By Thos. Houghton
Substitute Atty

UNITED STATES PATENT OFFICE.

HENRY WIGHT, OF MALDEN, MASSACHUSETTS.

IMPROVEMENT IN THE METHODS OF FORMING LAST-BLANKS.

Specification forming part of Letters Patent No. 182,253, dated September 12, 1876; application filed July 29, 1876.

*To all whom it may concern:*

Be it known that I, HENRY WIGHT, of the town of Malden, county of Middlesex, and State of Massachusetts, have invented a new and useful Improvement in the Method of Forming Last-Blanks, which improvement is fully set forth in the following specification:

This invention relates to the production of wooden blanks, to be worked up into lasts for boot or shoe manufacturing purposes directly from the log; and it consists in the operations hereinafter described and claimed, reference being had to the accompanying drawing.

Figure 1:
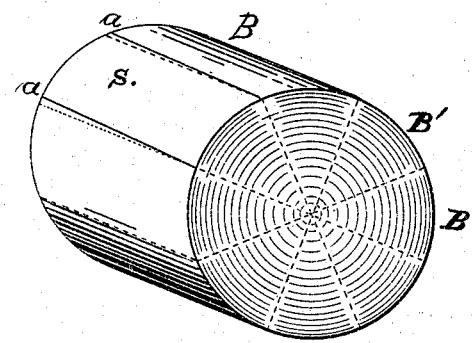

In carrying out my invention, I begin at the second stage of the operation now in use, and I take the "bolt," as it is called, which is a section of a log cut according to the size of last-blanks, and into lengths or bolts, as shown in Figure 1. The rifting of this bolt by beetle and froe, as is the present practice, results frequently in one block being increased in size beyond what is desired, and the adjoining one diminished, as shown by the lines *a a*, Fig. 1, supposed to be made by the froe following the grain of the wood. This contingency requires the sections S to be laid out large in the bolt, and laboriously worked down subsequently by the broad-ax to the common and irregular blank now used.

I first lay out the bolt B, as shown in Fig. 1, say, large enough to produce lasts of three different sizes, and saw it into the blocks B' B', preferring to use the band-saw as most suitable for the purpose.

Figure 2:
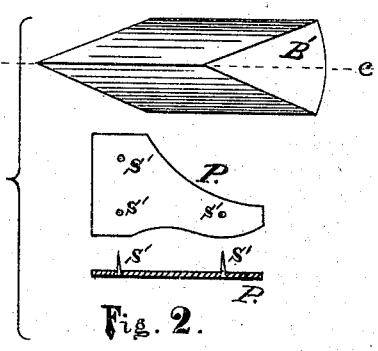
Figure 4:
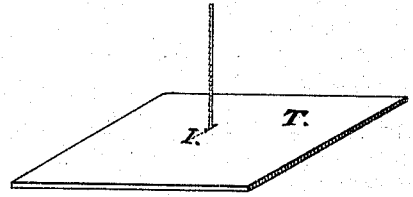

Second, having provided the patterns of the side shape P, Fig. 2, with steel pins S', I place the patterns P (which are, say, one-half inch thick) on the under side of the block B', Fig. 2, and secure them together by driving the pins S' into the wood. The edge of the pattern P is thick enough to answer as a guide and bearing-surface for the pin I, Fig. 4, which is placed in the saw-table T as close in front, and covering the cut of the saw as nearly, as possible. I complete this second stage of my method by sawing the block B' by the band-saw, continually pressing the pattern-edge hard against the pin I.

The block B' should be placed on the table with its center plane (indicated by the line C) parallel to the plane of the saw-table T, as shown in Fig. 2.

The pattern may be placed on the upper side of the block B', and used as a guide for the saw in cutting the same; but I prefer the method formerly described.

Figure 3:
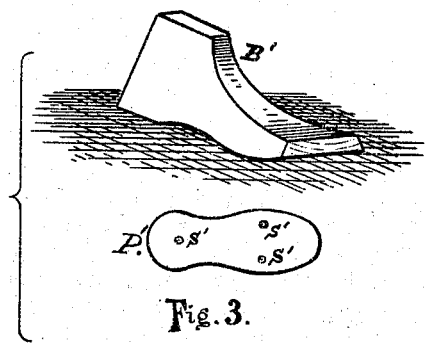

Third, having provided the pattern of the bottom shape P', I attach it to the under side of the blank B', Fig. 3, by the three pins S', which is in position, as to the saw-table T, for sawing the bottom shape.

The same method of guiding the block by means of the pin I is to be followed as before.

The proper instrument for this work is the band-saw, which performs the work in an easy and complete manner. The product is a last-blank as perfect in a degree as a finished last, which may be assorted and classified; as, for instance, the sizes of arctic lasts run from 6 to 13, and I propose to make, say, three sizes of last-blanks, (each one suitable for any one of three sizes,) one, say, seven inches high, four inches wide, and eleven and a half inches long; the next, respectively, seven and a quarter, four and a quarter, and twelve and a half inches, and the last of the three, respectively, seven and a half, four and a half, and thirteen and a half inches.

Lasts of other kinds may be varied accordingly; but in each case the amount of work in shaping and turning the last is reduced to a minimum, while the pores of the wood are opened in all directions by the several cuts made, so as to promote thorough seasoning.

Figure 5:
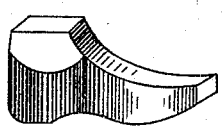

By these processes I reduce the production of last-blanks to a system. The blank which is the product of the several operations described is shown in Fig. 5.

I claim as my invention—

The improvement in the art of making last-blanks, shown and described, consisting in the operations one, two, and three, conducted substantially as set forth.

HENRY WIGHT.

Witnesses:
A. COOLIDGE ATWOOD,
WILLIAM NUTT.